(12) United States Patent
Liu et al.

(10) Patent No.: US 12,416,559 B1
(45) Date of Patent: Sep. 16, 2025

(54) MEASUREMENT APPARATUS AND METHOD FOR HYDROGEN SOLUBILITY AND COMPETITIVE DISSOLUTION OF MULTI-COMPONENT GASES

(71) Applicant: Peking University, Beijing (CN)

(72) Inventors: Quanyou Liu, Beijing (CN); Pengpeng Li, Beijing (CN)

(73) Assignee: Peking University, Beijing (CN)

( * ) Notice: Subject to any disclaimer, the term of this patent is extended or adjusted under 35 U.S.C. 154(b) by 0 days.

(21) Appl. No.: 19/190,645

(22) Filed: Apr. 27, 2025

(30) Foreign Application Priority Data

Nov. 14, 2024 (CN) .......................... 202411621484.1

(51) Int. Cl.
| | | |
|---|---|---|
| G01N 35/00 | (2006.01) | |
| G01N 7/04 | (2006.01) | |
| G01N 30/02 | (2006.01) | |

(52) U.S. Cl.
CPC .............. *G01N 7/04* (2013.01); *G01N 30/02* (2013.01); *G01N 2030/025* (2013.01)

(58) Field of Classification Search
None
See application file for complete search history.

(56) References Cited

U.S. PATENT DOCUMENTS

| | | |
|---|---|---|
| 2022/0341833 A1 | 10/2022 | Song et al. |
| 2024/0319066 A1 | 9/2024 | He et al. |

FOREIGN PATENT DOCUMENTS

| | | | | |
|---|---|---|---|---|
| CN | 1945275 A | 4/2007 | | |
| CN | 105221122 A | 1/2016 | | |
| CN | 105806738 A | * 7/2016 | ............... | G01N 7/04 |
| CN | 107063919 A | 8/2017 | | |
| CN | 113049763 A | 6/2021 | | |
| CN | 218674609 U | 3/2023 | | |
| CN | 115993303 A | 4/2023 | | |
| CN | 116537752 A | 8/2023 | | |
| CN | 117471030 A | 1/2024 | | |
| CN | 117607365 A | 2/2024 | | |
| CN | 118858527 A | 10/2024 | | |

OTHER PUBLICATIONS

CN 105806738 A (Liu) Translation (Year: 2016).*

* cited by examiner

*Primary Examiner* — Paul S Hyun
(74) *Attorney, Agent, or Firm* — Bayramoglu Law Offices LLC (57) ABSTRACT

A measurement apparatus for hydrogen solubility and competitive dissolution of multi-component gases includes a gas dissolution mechanism, and the gas dissolution mechanism includes a heat-insulated box. A first piston plate and a second piston plate are slidably connected in a dissolution cylinder and a gas cylinder, respectively, a middle part of the first piston plate is connected to a gas transport pipe, and the gas transport pipe can connect upper and lower spaces of the first piston plate. The apparatus can clearly determine partial pressure generated by conversion of the formation water into the water vapor, and maintains preset partial pressure of hydrogen through dynamic adjustment by the second piston plate to eliminate an error caused by the change in a volume of the formation water. The first piston plate isolates a gas from the formation water to prevent the backflow of the formation water during gas replacement and vacuumizing.

10 Claims, 6 Drawing Sheets

MEASUREMENT APPARATUS AND METHOD FOR HYDROGEN SOLUBILITY AND COMPETITIVE DISSOLUTION OF MULTI-COMPONENT GASES

CROSS REFERENCE TO THE RELATED APPLICATIONS

This application is based upon and claims priority to Chinese Patent Application No. 202411621484.1, filed on Nov. 14, 2024, the entire contents of which are incorporated herein by reference.

TECHNICAL FIELD

The present disclosure relates to the technical field of gas solubility measurement, and in particular, to a measurement apparatus and method for hydrogen solubility and competitive dissolution of multi-component gases.

BACKGROUND

In the geological body, formation water is widely distributed. As the most critical fluid type at the basin scale, the formation water serves as a carrier for many gas components. Influenced by geological structures and deep hydrothermal fluid transformation, solubility of gas components in the formation water varies with temperature and pressure conditions. Quantitative evaluation of dissolution/desorption characteristics of hydrogen in the formation water not only is helpful for a deep understanding of large-scale migration and accumulation of natural hydrogen in the geological body, but also holds significant importance for geological hydrogen storage technologies.

In the migration process, the formation water may come into contact with other gases such as methane, nitrogen, and carbon dioxide. These gases may exhibit competitive dissolution with the hydrogen in the formation water, that is, they compete for limited dissolution space in the formation water, thereby influencing the dissolution and desorption characteristics of the hydrogen. Therefore, competitive dissolution testing is required to accurately evaluate dissolution and desorption behaviors of the hydrogen in the formation water.

The competitive dissolution testing is mainly intended to determine how much hydrogen will be desorbed when hydrogen-dissolved formation water comes into contact with other gases, in order to evaluate feasibility and efficiency of hydrogen storage in a formation. Drawing on experimental ideas of solid materials for gas adsorption, a gas solubility measurement system typically directly introduces a gas into water and obtains solubility of the gas through conversion by monitoring a pressure change in a constant volume reaction vessel. However, this method may have following drawbacks: (1) Unlike the solid materials, as a temperature increases, the formation water will be converted into water vapor, affecting pressure of the reaction vessel, and also will expand to reduce a volume occupied by a gas phase in the reaction vessel, thereby causing an error in the experimental result. (2) Due to an inability to effectively isolate the gas from the formation water, vacuumizing can cause backflow of the formation water, making it impossible to simulate a competitive dissolution experiment of multi-component gases.

SUMMARY

The present disclosure provides a measurement apparatus for hydrogen solubility and gas solubility under competitive dissolution of multi-component gases. The measurement apparatus has advantages of determining partial pressure generated by converting formation water into water vapor under different temperature conditions, performing dynamic adjustment through a piston plate to ensure that preset partial pressure of hydrogen is reached in a reaction vessel, and accurately measuring solubility of the hydrogen, in order to eliminate an error in an experimental result due to temperature-dependent gas dissolution in the formation water. In addition, a piston plate connected to a gas transport pipe is added to a dissolution cylinder, which can isolate a gas from the formation water and prevent backflow of the formation water due to ineffective isolation between the gas and the formation water during vacuumizing.

To solve the above technical problem, the present disclosure provides following technical solutions.

A measurement apparatus for hydrogen solubility and competitive dissolution of multi-component gases includes a gas dissolution mechanism, where the gas dissolution mechanism includes a heat-insulated box, two dissolution cylinders and a gas cylinder are provided in the heat-insulated box, one of the dissolution cylinders is connected to the gas cylinder through a pipeline, a first piston plate is slidably connected inside each of the two dissolution cylinders, and a second piston plate is slidably connected inside the gas cylinder; and the gas cylinder is connected to upper spaces of the first piston plates inside the two dissolution cylinders through two pipelines, respectively, the upper spaces of the first piston plates inside the two dissolution cylinders are connected to each other through a pipeline, lower spaces of the first piston plates inside the two dissolution cylinders are connected to each other through a pipeline, the upper pipeline is configured to transport a gas, the lower pipeline is configured to transport liquid, a middle part of the first piston plate is connected to a gas transport pipe, and the gas transport pipe is configured to connect the upper space and the lower space of the first piston plate.

Furthermore, a gas injection mechanism is further included, where the gas injection mechanism includes a hydrogen tank and a methane tank, each of the hydrogen tank and the methane tank is connected to a same booster pump through a pipeline, and the booster pump is connected to the gas cylinder through a pipeline; and after hydrogen is desorbed from water, the gas cylinder and the dissolution cylinder are vacuumized to remove the hydrogen, and then high-purity methane is injected into the gas cylinder and the dissolution cylinder.

Furthermore, a desorption mechanism is further included, where the desorption mechanism includes a thermal desorption device, the thermal desorption device is connected to the dissolution cylinder through a pipeline, and a valve is provided on the pipeline connecting the thermal desorption device and the dissolution cylinder; and the desorption mechanism further includes a gas collection tank, where the gas collection tank is connected to the thermal desorption device through a pipeline, a lower part of the gas collection tank is provided with a high-precision balance, and a pressure gauge is provided on the gas collection tank.

Furthermore, the desorption mechanism further includes a quadrupole mass spectrometer, and the quadrupole mass spectrometer is connected to the gas collection tank through a pipeline.

Furthermore, a control mechanism is further included, where the control mechanism includes a threaded sleeve connected to a lower surface of the second piston plate, a threaded rod is threadedly connected in the threaded sleeve and fixedly arranged in an axial position, the threaded sleeve is slidably connected to the gas cylinder through a key, and when the threaded rod rotates, the second piston plate is allowed to slide vertically inside the gas cylinder.

Furthermore, the control mechanism further includes a motor, an output end of the motor is connected to a first magnet, a bottom end of the threaded rod is connected to a second magnet, and the first magnet is magnetically coupled to the second magnet, where when air pressure inside the gas cylinder is lower than 1 kPa, the first magnet drives the second magnet to rotate synchronously, and when the air pressure inside the gas cylinder is higher than 1 kPa, the first magnet rotates relative to the second magnet, thereby maintaining the air pressure inside the gas cylinder at 1 kPa.

Furthermore, the control mechanism further includes a vent hole, the vent hole is formed in a sidewall of the gas transport pipe and located below the first piston plate, a fixed seat is connected to a bottom end of the gas transport pipe, a cylindrical barrel is rotatably connected to the fixed seat, and an inner wall of the cylindrical barrel is attached to an outer wall of the gas transport pipe; and the sidewall of the cylindrical barrel is provided with a through groove, and when the air pressure inside the gas cylinder is not lower than 1 kPa, the cylindrical barrel rotates relative to the gas transport pipe to communicate the vent hole with the through groove.

Furthermore, the control mechanism further includes an arc-shaped cylinder, a cylinder body of the arc-shaped cylinder is connected to the fixed seat, a piston rod of the arc-shaped cylinder is connected to the cylindrical barrel, and when the arc-shaped cylinder extends or retracts, the arc-shaped cylinder drives the cylindrical barrel to rotate relative to the gas transport pipe.

Furthermore, the control mechanism further includes two first gears meshed with each other and two second gears meshed with each other, where one of the first gears and one of the second gears are fixedly connected to the second magnet and the first magnet respectively, an upper part of the other first gear is connected to a piston barrel, a gas conduit is connected between the piston barrel and the arc-shaped cylinder, a circular plate is slidably connected inside the piston barrel, a screw is connected to a lower surface of the circular plate, the screw is threaded to this first gear, a bottom end of the screw is connected to a limiting rod, and the limiting rod is axially and slidably connected to the second gear located directly below the piston barrel through a key; and when the air pressure inside the gas cylinder is lower than 1 kPa, the first gear and the second gear rotate synchronously, such that the screw does not rotate relative to the first gear, and the circular plate does not move upwards relative to the piston barrel; and when the air pressure inside the gas cylinder is higher than 1 kPa, the second gear rotates relative to the first gear, such that the screw rotates relative to the first gear to allow the circular plate to move upwards relative to the piston barrel, thereby extending the arc-shaped cylinder.

A measurement method for hydrogen solubility and competitive dissolution of multi-component gases is applied to the measurement apparatus for hydrogen solubility and competitive dissolution of multi-component gases, and includes following steps:

S1. vacuumizing the gas cylinder and one of the dissolution cylinders, closing a valve of a pipeline for transporting the liquid, setting the heat-insulated box to a test temperature after the dissolution cylinder is vacuumized, opening a connecting valve on a pipeline connecting the one of the dissolution cylinders and the gas cylinder, injecting hydrogen into the gas cylinder, and stopping the injection when injection pressure of the hydrogen reaches a preset pressure;

S2. controlling the gas transport pipe to open, such that the hydrogen is dissolved in water, where when the hydrogen is dissolved in the water and a volume of the water changes, the first piston plate is lifted by volume-changed water to move upwards relative to the dissolution cylinder; and when the first piston plate moves upwards, the second piston plate moves downwards inside the gas cylinder by an equal distance, thereby maintaining the preset pressure of the hydrogen;

S3. desorbing the hydrogen dissolved in the water to obtain an amount of desorbed hydrogen;

S4. after repeating the steps S1 and S2, vacuumizing the gas cylinder and the other dissolution cylinder, closing the connecting valve opened in the step S1, opening a connecting valve on a pipeline connecting the other dissolution cylinder and the gas cylinder, opening the valve of the pipeline for transporting the liquid, closing the valve of the pipeline for transporting the liquid after the hydrogen-dissolved water is transported to the other dissolution cylinder through the pipeline, injecting a competitive gas into the gas cylinder, and stopping the injection when an injection pressure of the competitive gas reaches a preset pressure;

S5. repeating the step S2 such that the second piston plate follows the first piston plate to move downwards by the equal distance; and S6. desorbing the hydrogen and the competitive gas dissolved in the water, collecting and recording a total amount of a desorbed mixed gas, injecting the collected mixed gas into a gas chromatography-mass spectrometer to determine percentage contents of different gas components, calculating amounts of desorbed hydrogen and a desorbed competitive gas, comparing the amounts of the desorbed hydrogen and the desorbed competitive gas with the amount of the desorbed hydrogen in the step S3, and obtaining dissolved amounts of hydrogen and methane in formation water after competitive dissolution of multi-component gases.

The present disclosure has following beneficial effects:

A measurement apparatus for hydrogen solubility and competitive dissolution of multi-component gases includes a gas dissolution mechanism. The gas dissolution mechanism includes a heat-insulated box, and a dissolution cylinder and a gas cylinder that are connected to each other are provided in the heat-insulated box. A first piston plate and a second piston plate are slidably connected in the dissolution cylinder and the gas cylinder, respectively. Water is filled in the dissolution cylinder below the first piston plate, a middle part of the first piston plate is connected to a gas transport pipe, and the gas transport pipe is configured to connect upper and lower spaces of the first piston plate. A connecting valve on the pipeline connecting the dissolution cylinder and the gas cylinder is opened, hydrogen is injected into the gas cylinder, and a position of the second piston plate is adjusted to achieve a required pressure value inside the gas cylinder. The gas transport pipe is controlled to open, such that the hydrogen is dissolved in the water. The first piston plate is controlled to move downwards to discharge hydrogen-dissolved water, the hydrogen is desorbed from the water, and a volume of desorbed hydrogen is collected and calculated.

The dissolution cylinder is vacuumized and then placed statically in different temperature environments. It is possible to determine partial pressure generated by conversion of formation water into water vapor under different temperature conditions. Preset partial pressure of the hydrogen is maintained through dynamic adjustment by the second piston plate to eliminate an error caused by a change in a volume of the formation water. The first piston plate isolates a gas from the formation water to prevent backflow of the formation water during gas replacement and vacuumizing.

BRIEF DESCRIPTION OF THE DRAWINGS

In order to illustrate the technical solutions in the specific implementations of the present disclosure or in the prior art more clearly, the accompanying drawings required for describing the specific implementations or the prior art will be briefly described below. Apparently, the accompanying drawings in the following description are some implementations of the present disclosure. For those of ordinary skill in the art, other accompanying drawings can also be obtained based on these accompanying drawings without creative efforts.

REFERENCE NUMERALS 100. gas injection mechanism; 110. hydrogen tank; 120. methane tank; 130. booster pump; 200. gas dissolution mechanism; 210. heat-insulated box; 220. gas cylinder; 230. dissolution cylinder; 300. control mechanism; 310. second piston plate; 311. threaded sleeve; 312. threaded rod; 313. second magnet; 314. motor; 315. first magnet; 320. first piston plate; 321. electric telescopic rod; 322. gas transport pipe; 3221. vent hole; 323. cylindrical barrel; 3231. through groove; 324. arc-shaped cylinder; 325. gas conduit; 330. first gear; 340. second gear; 350. circular plate; 360. screw; 370. limiting rod; 380. piston barrel; 381. limiting pin; 382. spring; 400. desorption mechanism; 410. thermal desorption device; 420. gas collection tank; 430. mass spectrometer.

DETAILED DESCRIPTION OF THE EMBODIMENTS

The following clearly and completely describes the technical solutions of the present disclosure with reference to accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

In the description of the present disclosure, it should be noted that orientations or position relationships indicated by terms such as "center", "top", "bottom", "left", "right", "vertical", "horizontal", "inner", and "outer" are based on the orientation or position relationships shown in the accompanying drawings, for ease of describing the present disclosure and simplifying the description only, rather than indicating or implying that the indicated apparatus or element must have a particular orientation or be constructed and operated in a particular orientation. Therefore, these terms should not be understood as a limitation to the present disclosure. Moreover, the terms "first", "second", and "third" are used only for the purpose of description, and are not intended to indicate or imply relative importance.

In the description of the present disclosure, it should be noted that, unless otherwise clearly specified, meanings of terms "installation", "interconnection", and "connection" should be understood in a broad sense. For example, the connection may be a fixed connection, a removable connection, or an integral connection; may be a mechanical connection or an electrical connection; may be a direct connection or an indirect connection by using an intermediate medium; or may be intercommunication between two elements. Those of ordinary skill in the art may understand specific meanings of the foregoing terms in the present disclosure based on a specific situation.

In Embodiment 1, as shown in FIG. 1 to FIG. 6, a measurement apparatus for hydrogen solubility and competitive dissolution of multi-component gases includes gas dissolution mechanism 200. The gas dissolution mechanism 200 includes heat-insulated box 210, and two dissolution cylinders 230 and a gas cylinder 220 are provided in the heat-insulated box 210. One dissolution cylinder 230 is connected to the gas cylinder 220 through a pipeline, first piston plate 320 is slidably connected inside each of the two dissolution cylinders 230, and second piston plate 310 is slidably connected inside the gas cylinder 220. The gas cylinder 220 is connected to upper spaces of the first piston plates 320 inside the two dissolution cylinders 230 through two pipelines, respectively, the upper spaces of the first piston plates 320 inside the two dissolution cylinders 230 are connected to each other through a pipeline, lower spaces of the first piston plates 320 inside the two dissolution cylinders 230 are connected to each other through a pipeline, the upper pipeline is configured to transport a gas, and the lower pipeline is configured to transport liquid. A middle part of the first piston plate 320 is connected to gas transport pipe 322, and the gas transport pipe 322 can connect the upper space and the lower space of the first piston plate 320.

Figure 1:
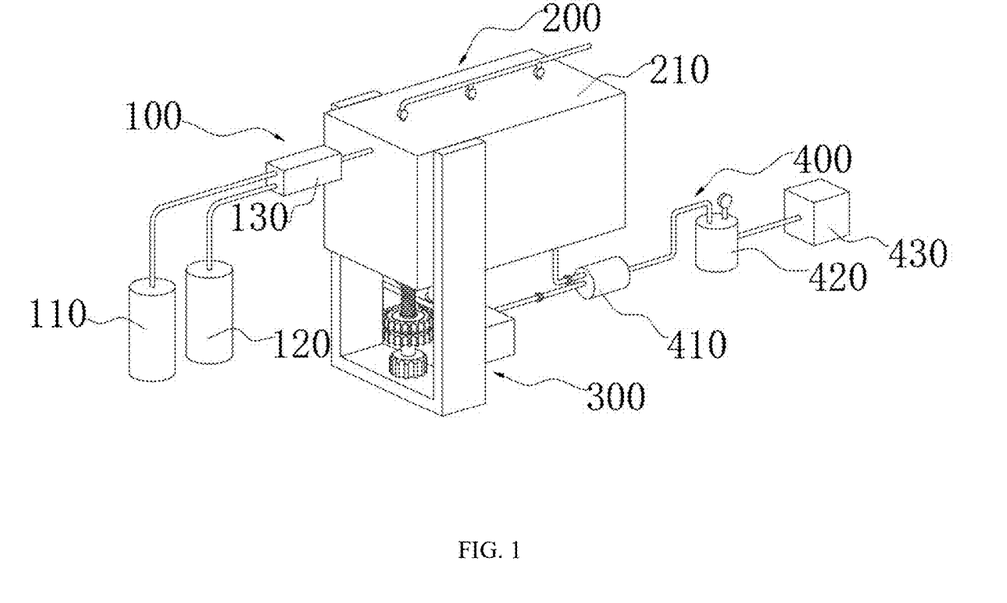
FIG. 1 is a schematic diagram illustrating an overall structure according to the present disclosure.
Figure 2:
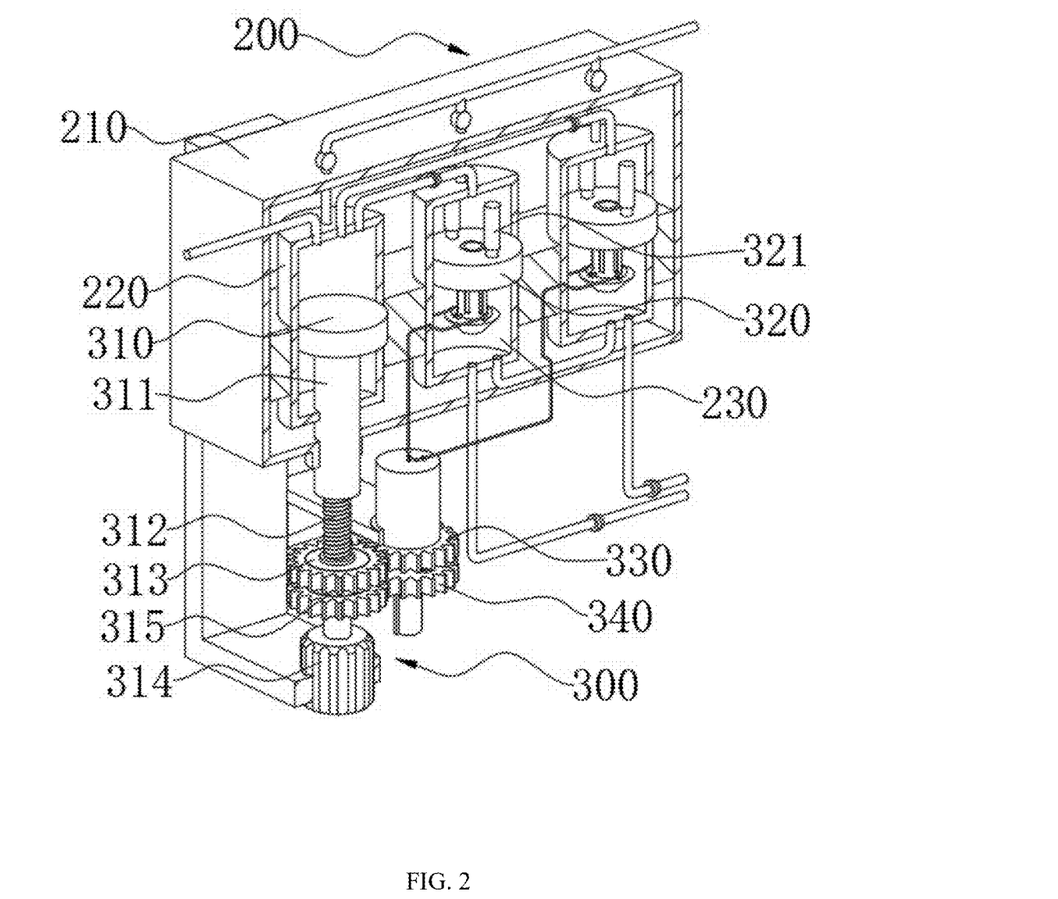
FIG. 2 is a sectional view of a heat-insulated box according to the present disclosure.

Working mechanisms of the measurement apparatus and method for hydrogen solubility and competitive dissolution of multi-component gases in this embodiment are as follows:

Each of the dissolution cylinder 230 and the gas cylinder 220 is provided with a pressure gauge. During use, water is injected into the dissolution cylinder 230. A liquid level sensor is provided in the dissolution cylinder 230. The liquid level sensor senses and records a height of the water inside the dissolution cylinder 230, which is denoted as $H_0$. Then, the water is vacuumized to discharge a dissolved gas in the water. Both the dissolution cylinder 230 and the gas cylinder 220 are provided in the heat-insulated box 210. The heat-insulated box 210 is adjusted to temperature T and then placed statically. Then pressure generated by water evaporation inside the dissolution cylinder 230 at the temperature T is recorded. After that, a valve of the pipeline between the dissolution cylinder 230 and the gas cylinder 220 is opened, and high-purity hydrogen is injected into the gas cylinder 220 to allow pressure inside the gas cylinder 220 to reach $P_0$, where the $P_0$ represents injection pressure of the hydrogen. When the hydrogen is dissolved in the water, air pressure inside the gas cylinder 220 and the dissolution cylinder 230 decreases, and a volume of the water increases because the hydrogen is dissolved in the water, causing the first piston plate 320 to move upwards. After the liquid level sensor detects an upward movement distance of the first piston plate 320, the second piston plate 310 moves downwards by the equal distance, such that injection partial pressure of the hydrogen is not affected by expansion of formation water. After the air pressure inside the dissolution cylinder 230 is stabilized, it indicates that the hydrogen can be dissolved into the water in the dissolution cylinder 230 again, and water solubility inside the dissolution cylinder 230 has been saturated. At this time, a water level height in the dissolution cylinder 230 is recorded as $H_1$, and an expansion coefficient of the water at this temperature and pressure is recorded as $V(H_1)-V(H_0)$/an amount of dissolved hydrogen. The first piston plate 320 is controlled to move downwards to discharge hydrogen-dissolved water. Then, a water level height in the dissolution cylinder 230 is recorded as $H_2$. Gas is desorbed from the gas-dissolved formation water, and a desorbed gas is collected. Under a standard condition, a volume of the gas is determined by recording a weight of the gas. If the volume of the gas is calculated by using the pressure gauge, an amount of substance in the gas is calculated according to an ideal state equation.

The above process measures solubility of the hydrogen. When competitive solubility of the gas is measured, the hydrogen-dissolved water in one dissolution cylinder 230 is extracted to the other dissolution cylinder 230 through the pipeline, such that the hydrogen-dissolved water is completely transferred to the other pre-vacuumized dissolution cylinder 230 to ensure experimental accuracy. After the hydrogen-dissolved water is completely transferred to the other dissolution cylinder 230, the gas cylinder 220 is vacuumized again to discharge the hydrogen in the gas cylinder 220. Then, methane is injected into the gas cylinder 220, and the above operations are repeated such that the methane can be dissolved in the water. Hydrogen desorbed due to methane dissolution remains in the dissolution cylinder 230. After the air pressure is stabilized again, water with a volume equal to a volume of the water from which hydrogen is desorbed is extracted, and desorption is performed again to obtain amounts of desorbed hydrogen and methane, thereby obtaining solubility of the experimental gases.

A temperature, pressure, salinity, and other conditions are set, and the above steps are repeated. An expansion coefficient of the formation water changes with the temperature, the pressure, the salinity, and the alkalinity, and the solubility of the hydrogen is detected under the change.

It should be noted that the experimental gases include but are not limited to the hydrogen and the methane. The competitive gas may be the methane, nitrogen, carbon dioxide, or any other gas present in a formation.

Specifically, a structure of gas injection mechanism 100 is as follows:

The gas injection mechanism 100 includes hydrogen tank 110 and methane tank 120. Each of the hydrogen tank 110 and the methane tank 120 is connected to same booster pump 130 through a pipeline, and the booster pump 130 is connected to the gas cylinder 220 through a pipeline. After the hydrogen is desorbed from the water, the gas cylinder 220 and the dissolution cylinder 230 are vacuumized to remove the hydrogen, and then high-purity methane is injected into the gas cylinder 220 and the dissolution cylinder 230.

When the solubility of the hydrogen is measured, the booster pump 130 extracts hydrogen from the hydrogen tank 110 and injects the extracted hydrogen into the gas cylinder 220. After the solubility of the hydrogen is measured, the gas cylinder 220 and the dissolution cylinder 230 are vacuumized to remove the hydrogen, but the hydrogen-dissolved water is not vacuumized. Then, the methane is pumped into the gas cylinder 220 through the booster pump 130, and the above step for measuring the solubility of the hydrogen is repeated. At this time, under pressure, the methane can be dissolved in the previous hydrogen-dissolved water, thereby simulating competitive adsorption of the gas. It should be noted that the two dissolution cylinders 230 are provided, and hydrogen-dissolved formation water is transferred from one dissolution cylinder 230 to the other dissolution cylinder 230. Subsequently, the dissolution cylinder 230 to which the hydrogen-dissolved formation water is transferred is vacuumized.

Specifically, a structure of desorption mechanism 400 is as follows:

The desorption mechanism 400 includes thermal desorption device 410. The thermal desorption device 410 is connected to the dissolution cylinder 230 through a pipeline, and a valve is provided on the pipeline connecting the thermal desorption device 410 and the dissolution cylinder 230.

The gas-dissolved water discharged from the dissolution cylinder 230 enters the thermal desorption device 410, and the gas-dissolved water is heated, such that the gas in the gas-dissolved water is desorbed when being heated. The desorbed gas is collected and its weight or volume is recorded.

The desorption mechanism 400 can also use an apparatus for applying negative pressure to desorb the gas from the water. To sufficiently desorb the gas, an ultrasonic oscillator can also be used to apply a vibration to the desorption mechanism 400.

In an optional implementation of this embodiment, preferably:

The desorption mechanism 400 further includes gas collection tank 420. The gas collection tank 420 is connected to the thermal desorption device 410 through a pipeline, and a pressure gauge is provided on the gas collection tank 420.

The gas collection tank 420 is connected to the thermal desorption device 410 through the pipeline, and the desorbed gas is collected through the gas collection tank 420. A pressure change inside the gas collection tank 420 is detected by the pressure gauge, and the volume of the gas is calculated based on the pressure change. A calculation formula is as follows:

$$\Delta V \propto (1/P_2 - 1/P_1)$$

In the above calculation formula, $\Delta V$ represents a volume change; $P_1$ represents initial pressure, and $P_2$ represents changed pressure.

In an optional implementation of this embodiment, preferably:

The desorption mechanism 400 further includes quadrupole mass spectrometer 430, and the quadrupole mass spectrometer 430 is connected to the gas collection tank 420 through a pipeline.

The second piston plate 310 moves downwards to squeeze formation water containing a dissolved mixed gas into the thermal desorption device 410 for gas desorption. A weight of the gas or a volume of the gas under the standard condition is recorded, and the collected gas is measured using the quadrupole mass spectrometer 430 to determine desorption efficiency of the hydrogen under different partial pressure conditions. Under the specified temperature and pressure conditions and in the presence of an associated gas component, the desorption efficiency of the hydrogen is the solubility of the hydrogen minus solubility of the hydrogen-containing mixture.

Figure 3:
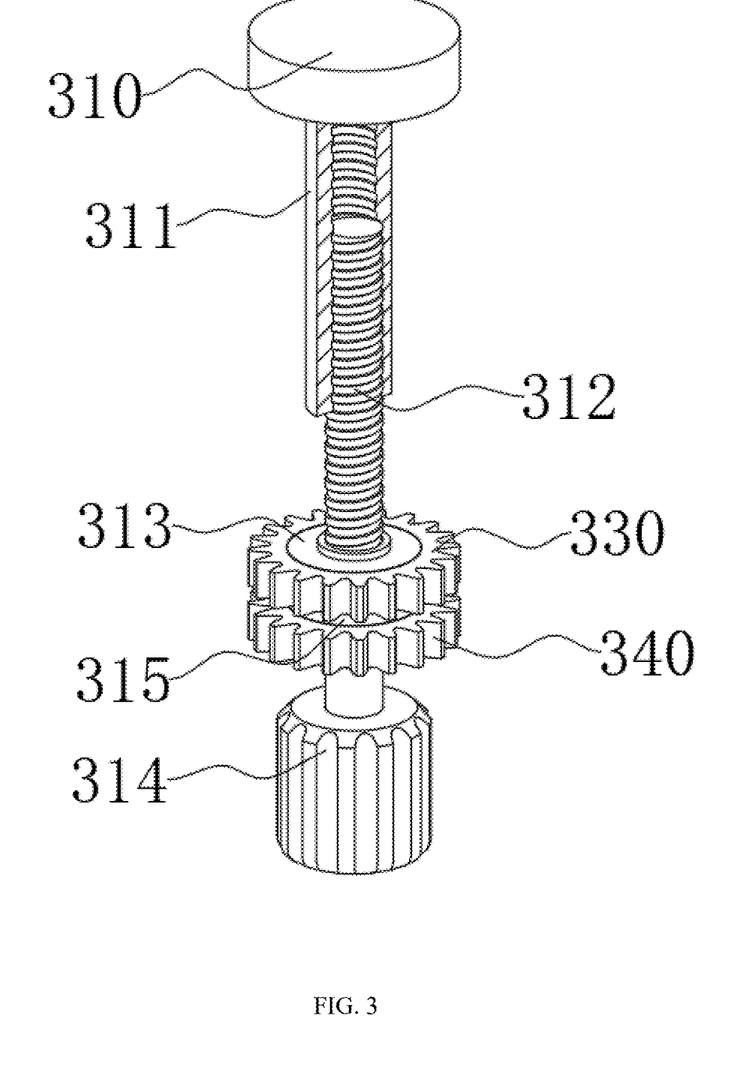
FIG. 3 is a schematic structural diagram of a threaded sleeve according to the present disclosure.

Specifically, a structure of control mechanism 300 is as follows:

The control mechanism 300 includes threaded sleeve 311 connected to a lower surface of the second piston plate 310. Threaded rod 312 is threadedly connected in the threaded sleeve 311 and fixedly arranged in an axial position, and the threaded sleeve 311 is slidably connected to the gas cylinder 220 through a key. When the threaded rod 312 rotates, the second piston plate 310 can slide vertically inside the gas cylinder 220.

The threaded rod 312 does not move in the axial position. Therefore, when the threaded rod 312 rotates relative to the threaded sleeve 311, the threaded sleeve 311 can slide axially. The threaded sleeve 311 is slidably connected to the gas cylinder 220 through the key, ensuring that the threaded sleeve 311 does not rotate relative to the gas cylinder 220. Therefore, when the threaded sleeve 311 moves, it can drive the second piston plate 310 to slide inside the gas cylinder 220, such that the pressure inside the gas cylinder 220 is controlled. Electric telescopic rod 321 is connected between the first piston plate 320 and a top wall of the dissolution cylinder 230. The electric telescopic rod 321 is controlled to extend or retract to make the first piston plate 320 move up and down. When the electric telescopic rod 321 is not started, it can freely extend or retract, such that a volume change of the gas-dissolved water can cause the first piston plate 320 to move passively.

In an optional implementation of this embodiment, preferably:

The control mechanism 300 further includes motor 314. An output end of the motor 314 is connected to first magnet 315, a bottom end of the threaded rod 312 is connected to second magnet 313, and the first magnet 315 is magnetically coupled to the second magnet 313. When the air pressure inside the gas cylinder 220 is lower than 1 kPa, the first magnet 315 can drive the second magnet 313 to rotate synchronously. When the air pressure inside the gas cylinder 220 is higher than 1 kPa, the first magnet 315 can rotate relative to the second magnet 313, thereby maintaining the air pressure inside the gas cylinder 220 at 1 kPa.

When gas pressure of the gas cylinder 220 and the dissolution cylinder 230 is maintained, the motor 314 is started to drive the second magnet 313 to rotate through a magnetic coupling effect between the first magnet 315 and the second magnet 313, such that the threaded rod 312 connected to the second magnet 313 rotates. At this time, the threaded rod 312 drives the second piston plate 310 to move upwards. When the air pressure inside the gas cylinder 220 is higher than 1 kPa, the rotation of the second magnet 313 is hindered due to the air pressure and frictional force between the threaded rod 312, the threaded sleeve 311, and the gas cylinder 220, such that the first magnet 315 rotates relative to the second magnet 313, thereby maintaining the air pressure inside the gas cylinder 220.

To ensure that the second piston plate 310 follows the first piston plate 320 to move by an equal distance, an electric current applied to the two magnets is adjusted to increase coupling force of the two magnets, and ensure that the motor 314 can drive the second piston plate 310 to move. At this time, the running of the motor 314 depends on a command issued by a control system after receiving and converting a measured value of the liquid level sensor, so as to dynamically adjust a position of the second piston plate 310, reduce an impact of a pressure change caused by water expansion, and achieve an effect of maintaining preset partial pressure of the hydrogen. In addition, the second piston plate 310 can also synchronously move based on the movement of the first piston plate 320 and a change of the air pressure. Data obtained by a water level sensor and a pressure value of the dissolution cylinder 230 are transmitted to the control system together, and the control system adaptively controls the movement of the second piston plate 310 on a condition that hydrogen pressure inside the dissolution cylinder 230 is maintained.

Figure 5:
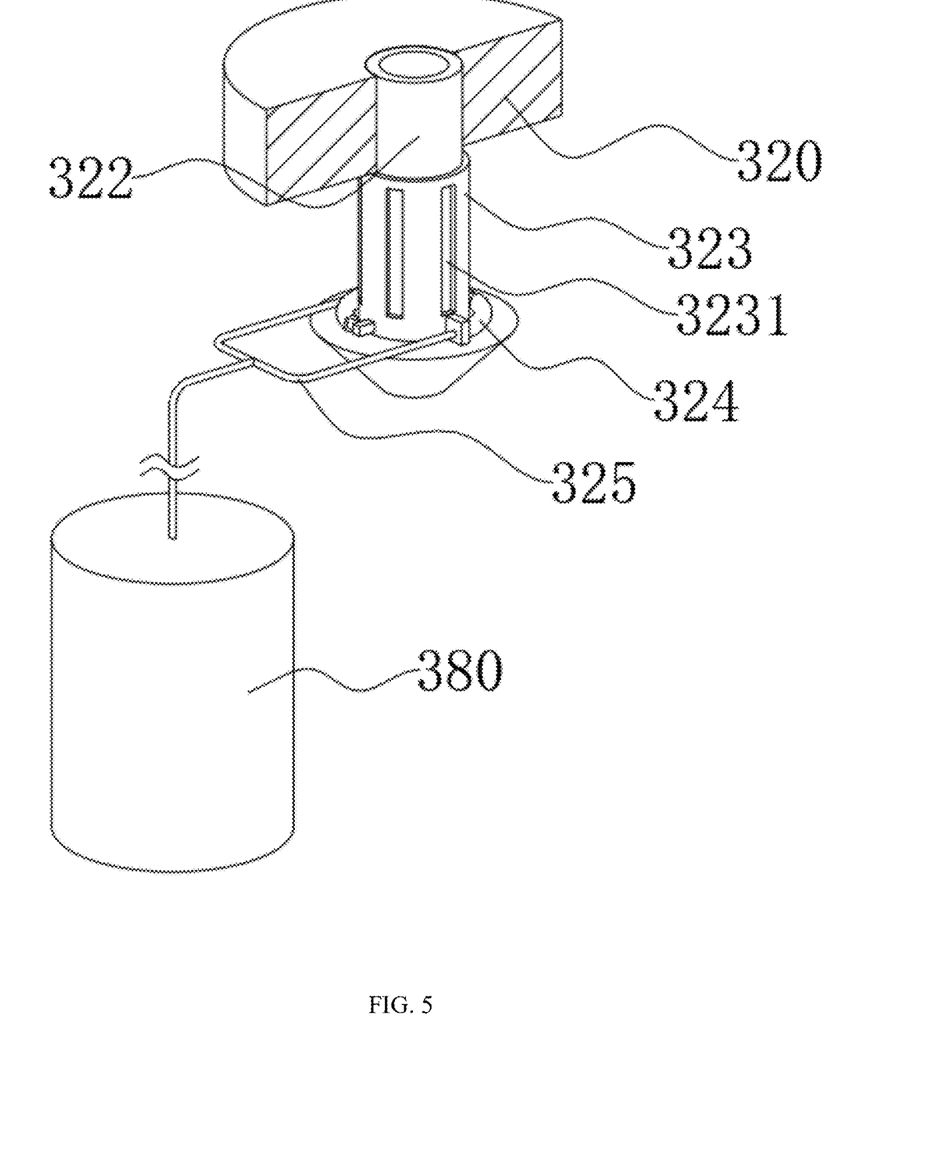
FIG. 5 is a schematic structural diagram of a gas transport pipe according to the present disclosure.
Figure 6:
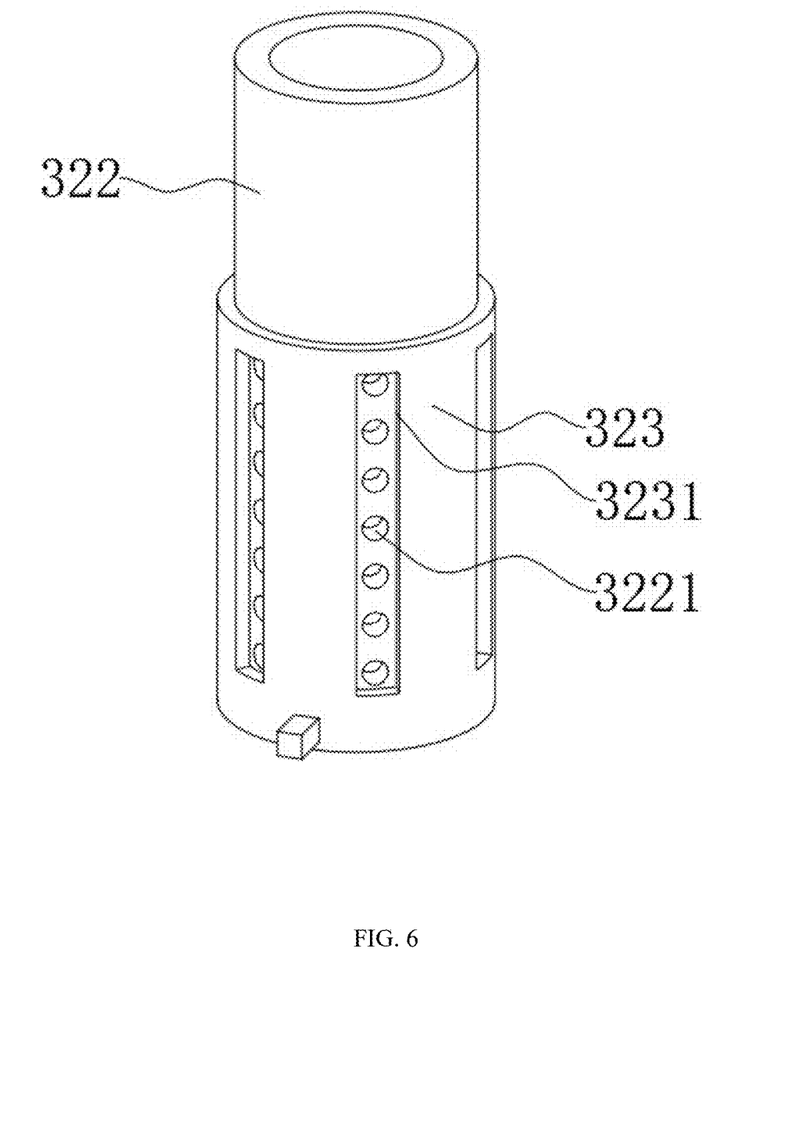
FIG. 6 is a schematic structural diagram of a cylindrical barrel according to the present disclosure.

In an optional implementation of this embodiment, preferably:

The control mechanism 300 further includes a vent hole 3221, and the vent hole 3221 is formed in a sidewall of the gas transport pipe 322 and located below the first piston plate 320. A fixed seat is connected to a bottom end of the gas transport pipe 322, cylindrical barrel 323 is rotatably connected to the fixed seat, and an inner wall of the cylindrical barrel 323 is attached to an outer wall of the gas transport pipe 322. A sidewall of the cylindrical barrel 323 is provided with through groove 3231. When the air pressure inside the gas cylinder 220 is not lower than 1 kPa, the cylindrical barrel 323 can rotate relative to the gas transport pipe 322 to communicate the vent hole 3221 with the through groove 3231.

When the air pressure inside the gas cylinder 220 and the dissolution cylinder 230 is 1 kPa, the vent hole 3221 on the gas transport pipe 322 connects upper and lower spaces of the dissolution cylinder 230, such that the hydrogen can be dissolved in water below the first piston plate 320. Conversely, when the air pressure inside the gas cylinder 220 and the dissolution cylinder 230 drops below 1 kPa, the vent hole 3221 is closed, preventing the hydrogen dissolved in the water from being desorbed due to low pressure.

In an optional implementation of this embodiment, preferably:

The control mechanism 300 further includes arc-shaped cylinder 324. A cylinder body of the arc-shaped cylinder 324 is connected to the fixed seat, and a piston rod of the arc-shaped cylinder 324 is connected to the cylindrical barrel 323. When the arc-shaped cylinder 324 extends or retracts, it can drive the cylindrical barrel 323 to rotate relative to the gas transport pipe 322.

When the arc-shaped cylinder 324 extends, it can push the cylindrical barrel 323 to rotate relative to the gas transport pipe 322, such that the through groove 3231 and the vent hole 3221 are connected, thereby connecting the upper and lower spaces of the first piston plate 320. When the arc-shaped cylinder 324 retracts, the through groove 3231 and the vent hole 3221 are no longer connected, thus isolating the upper and lower spaces of the first piston plate 320.

Figure 4:
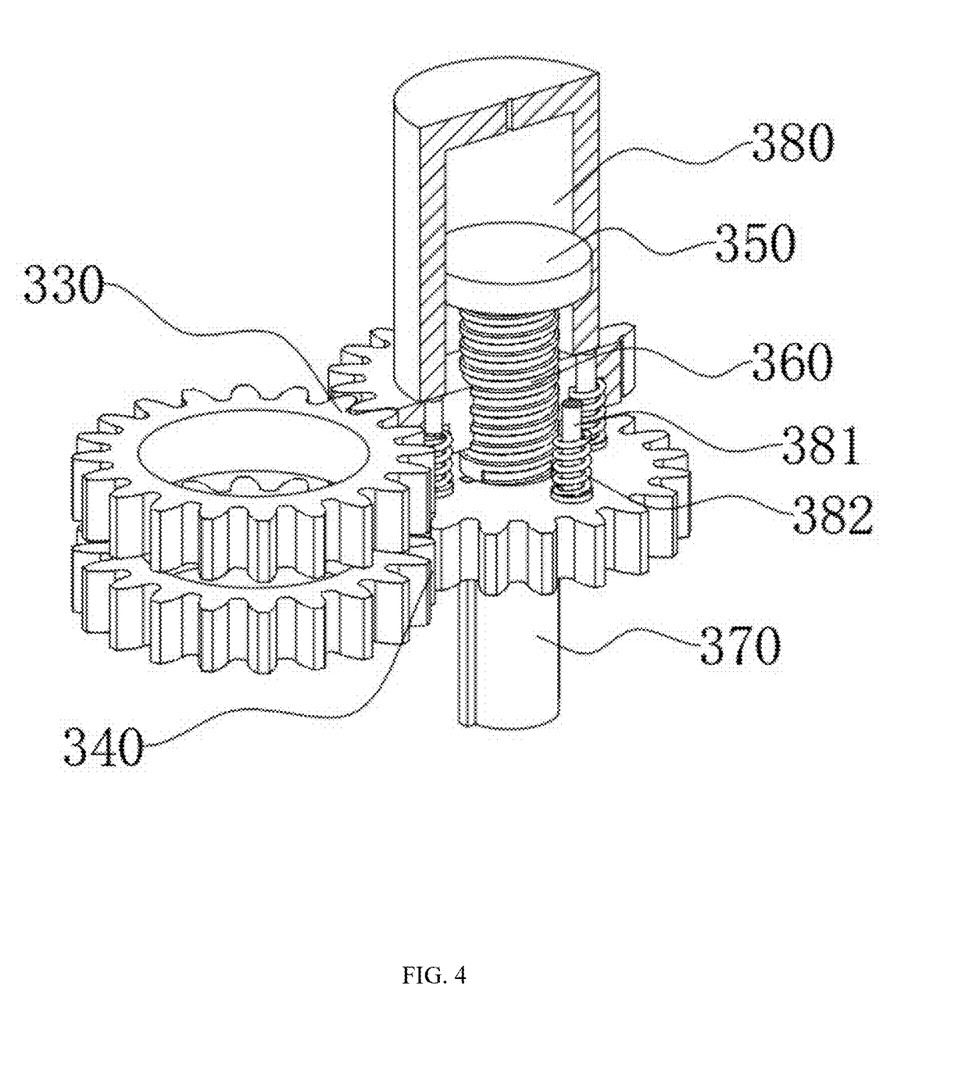
FIG. 4 is a sectional view of a piston barrel according to the present disclosure.

In an optional implementation of this embodiment, preferably:

The control mechanism 300 further includes two first gears 330 meshed with each other and two second gears 340 meshed with each other. One first gear 330 and one second gear 340 are fixedly connected to the second magnet 313 and the first magnet 315 respectively, and an upper part of the other first gear 330 is connected to piston barrel 380, gas conduit 325 is connected between the piston barrel 380 and the arc-shaped cylinder 324. Circular plate 350 is slidably connected inside the piston barrel 380, screw 360 is connected to a lower surface of the circular plate 350, the screw 360 is threaded to this first gear 330, a bottom end of the screw 360 is connected to limiting rod 370, and the limiting rod 370 is axially and slidably connected to the second gear 340 located directly below the piston barrel 380 through a key. When the air pressure inside the gas cylinder 220 is lower than 1 kPa, the first gear 330 and the second gear 340 rotate synchronously, such that the screw 360 does not rotate relative to the first gear 330, and the circular plate 350 does not move upwards relative to the piston barrel 380. When the air pressure inside the gas cylinder 220 is higher than 1 kPa, the second gear 340 rotates relative to the first gear 330, such that the screw 360 rotates relative to the first gear 330 to allow the circular plate 350 to move upwards relative to the piston barrel 380, thereby extending the arc-shaped cylinder 324.

When the air pressure inside the gas cylinder 220 is lower than 1 kPa, the first magnet 315 can drive the second magnet 313 to rotate synchronously, such that the first gear 330 and the second gear 340 rotate synchronously. The other first gear 330 and the other second gear 340 respectively mesh with the first gear 330 and the second gear 340, such that the other first gear 330 and the other second gear 340 rotate synchronously. At this time, there is no relative rotation between the screw 360 and the corresponding first gear 330, so the screw 360 does not slide axially relative to the first gear 330. At this time, the circular plate 350 does not slide inside the piston barrel 380, and air inside the piston barrel 380 does not enter the arc-shaped cylinder 324. In this state, the air pressure inside the gas cylinder 220 and the dissolution cylinder 230 is lower than 1 kPa. When the air pressure is higher than 1 kPa, the first magnet 315 rotates relative to the second magnet 313. As a result, the first gear 330 and the second gear 340 rotate relative to each other. At this time, the limiting rod 370 slidably connected to the other second gear 340 through a key rotates relative to the other first gear 330. The screw 360 connected to the limiting rod 370 rotates relative to the first gear 330 connected to the screw 360, and the circular plate 350 slides upwards inside the piston barrel 380, causing the air inside the piston tube 380 to enter the arc-shaped cylinder 324. At this time, the arc-shaped cylinder 324 extends. After the arc-shaped cylinder 324 extends, the motor 314 stops running. A pressure relief valve is also provided on the gas conduit 325 connected between the piston barrel 380 and the arc-shaped cylinder 324. An air pressure sensor is provided in the gas cylinder 220. When the pressure sensor detects that the air pressure is lower than 1 kPa, the pressure relief valve is opened. After the arc-shaped cylinder 324 retracts, the pressure relief valve is closed again. Based on a value of the air pressure sensor, the motor 314 is restarted to pressurize the gas cylinder 220 and the dissolution cylinder 230, and the above actions are repeated.

Each of the two dissolution cylinders 230 is provided with the control mechanism 300, and each of the gas conduits 325 of the two control mechanisms 300 is connected to the piston barrel 380. Each of the two gas conduits 325 is provided with the valve, and opening and closing states of the two valves are adjusted based on a usage status of the two dissolution cylinders 230.

With a relative axial movement between the screw 360 and the piston barrel 380, the circular plate 350 can move up to a top wall of the piston barrel 380. At this time, the circular plate 350 continues to move, which causes limiting pin 381 connected to the piston barrel 380 to slide upwards relative to the second gear 340, and compresses spring 382.

A pressure sensitive switch is provided at a top of the piston barrel 380 to control the motor 314 to turn off. When the piston barrel 380 moving upwards abuts against with the pressure sensitive switch, the motor 314 stops running, such that the apparatus will not be seriously damaged.

Embodiment 2

Based on Embodiment 1, a measurement method for hydrogen solubility and competitive dissolution of multi-component gases is applied to the measurement apparatus for hydrogen solubility and competitive dissolution of multi-component gases, and includes following steps:

S1. The gas cylinder 220 and one dissolution cylinder 230 are vacuumized, a valve of a pipeline for transporting the liquid is closed, the heat-insulated box 210 is set to a test temperature after the dissolution cylinder 230 is vacuumized, a connecting valve on a pipeline connecting the one dissolution cylinder 230 and the gas cylinder 220 is opened, hydrogen is injected into the gas cylinder 220, and the injection is stopped when injection pressure of the hydrogen reaches a preset pressure.

S2. The gas transport pipe 322 is controlled to open, such that the hydrogen is dissolved in water, where when the hydrogen is dissolved in the water and a volume of the water changes, the first piston plate 320 is lifted by volume-changed water to move upwards relative to the dissolution cylinder 230; and when the first piston plate 320 moves upwards, the second piston plate 310 moves downwards inside the gas cylinder 220 by an equal distance, thereby maintaining the preset pressure of the hydrogen.

S3. The hydrogen dissolved in the water is desorbed to obtain an amount of desorbed hydrogen.

S4. After the steps S1 and S2 are repeated, the gas cylinder 220 and the other dissolution cylinder 230 are vacuumized, the connecting valve opened in the step S1 is closed, a connecting valve on a pipeline connecting the other dissolution cylinder 230 and the gas cylinder 220 is opened, the valve of the pipeline for transporting the liquid is opened, the valve of the pipeline for transporting the liquid is closed after the hydrogen-dissolved water is transported to the other dissolution cylinder 230 through the pipeline, a competitive gas is injected into the gas cylinder 220, and the injection is stopped when an injection pressure of the competitive gas reaches a preset pressure.

S5. The step S2 is repeated such that the second piston plate 310 follows the first piston plate 320 to move downwards by the equal distance.

S6. The hydrogen and the competitive gas dissolved in the water are desorbed, a total amount of a desorbed mixed gas is collected and recorded, the collected mixed gas is injected into a gas chromatography-mass spectrometer to determine percentage contents of different gas components, amounts of desorbed hydrogen and a desorbed competitive gas are calculated, the amounts of the desorbed hydrogen and the desorbed competitive gas are compared with the amount of the desorbed hydrogen in the step S3, and dissolved amounts of hydrogen and methane in formation water after competitive dissolution of multi-component gases are obtained.

Finally, it should be noted that the above implementations are merely intended to describe the technical solutions of the present disclosure, rather than to limit the present disclosure. Although the present disclosure is described in detail with reference to the above implementations, persons of ordinary skill in the art should understand that they may still make modifications to the technical solutions described in the above implementations or make equivalent replacements to some or all technical features thereof, and these modifications or substitutions do not cause the essence of the corresponding technical solutions to depart from the scope of the technical solutions of the implementations of the present disclosure.

What is claimed is:

1. A measurement apparatus for hydrogen solubility and competitive dissolution of multi-component gases, comprising:
 a gas dissolution mechanism, wherein
  the gas dissolution mechanism comprises a heat-insulated box, wherein two dissolution cylinders and a gas cylinder are provided in the heat-insulated box, each of the two dissolution cylinders is connected to the gas cylinder through a pipeline, a first piston plate is slidably connected inside each of the two dissolution cylinders, and a second piston plate is slidably connected inside the gas cylinder; and
  the gas cylinder is connected to an upper space above each of the first piston plates inside the two dissolution cylinders through each of the pipelines, respectively, the upper spaces above each of the first piston plates inside the two dissolution cylinders are connected to each other through an upper pipeline, a lower space below each of the first piston plates inside the two dissolution cylinders are connected to each other through a lower pipeline, the upper pipeline is configured to transport a gas, the lower pipeline is configured to transport liquid, a middle part of each first piston plate is connected to a gas transport pipe, and each gas transport pipe is configured to connect the upper space above a first piston plate and the lower space below said first piston plate.

2. The measurement apparatus for hydrogen solubility and competitive dissolution of multi-component gases according to claim 1, further comprising a gas injection mechanism, wherein the gas injection mechanism comprises a hydrogen tank and a competitive gas tank, each of the hydrogen tank and the competitive gas tank is connected to a same booster pump through a pipeline, and the booster pump is connected to the gas cylinder through a pipeline.

3. The measurement apparatus for hydrogen solubility and competitive dissolution of multi-component gases according to claim 2, further comprising a desorption mechanism, wherein the desorption mechanism comprises a thermal desorption device, and the thermal desorption device is connected to each of the two dissolution cylinders through a pipeline, and a valve is provided on the pipeline connecting the thermal desorption device and the two dissolution cylinders; and
 the desorption mechanism further comprises a gas collection tank, wherein the gas collection tank is connected to the thermal desorption device through a pipeline, and a pressure gauge is provided on the gas collection tank.

4. The measurement apparatus for hydrogen solubility and competitive dissolution of multi-component gases according to claim 3, wherein the desorption mechanism further comprises a quadrupole mass spectrometer, and the quadrupole mass spectrometer is connected to the gas collection tank through a pipeline.

5. The measurement apparatus for hydrogen solubility and competitive dissolution of multi-component gases according to claim 4, further comprising a control mechanism, wherein the control mechanism comprises a threaded sleeve connected to a lower surface of the second piston plate, a threaded rod is threadedly connected in the threaded sleeve and fixedly arranged in an axial position, the threaded sleeve is slidably connected to the gas cylinder through a key, and when the threaded rod rotates, the second piston plate is allowed to slide vertically inside the gas cylinder.

6. The measurement apparatus for hydrogen solubility and competitive dissolution of multi-component gases according to claim 5, wherein the control mechanism further comprises a motor, an output end of the motor is connected to a first magnet, a bottom end of the threaded rod is connected to a second magnet, and the first magnet is magnetically coupled to the second magnet, wherein when air pressure inside the gas cylinder is lower than 1 kPa, the first magnet drives the second magnet to rotate synchronously, and when the air pressure inside the gas cylinder is higher than 1 kPa, the first magnet rotates relative to the second magnet, thereby maintaining the air pressure inside the gas cylinder at 1 kPa.

7. The measurement apparatus for hydrogen solubility and competitive dissolution of multi-component gases according to claim 6, wherein the control mechanism further comprises a vent hole in a sidewall of each gas transport pipe and located below each of the first piston plates, a fixed seat is connected to a bottom end of each gas transport pipe, a cylindrical barrel is rotatably connected to each fixed seat, and an inner wall of each cylindrical barrel is attached to an outer wall of a gas transport pipe; and
 a sidewall of each cylindrical barrel is provided with a through groove, and when the air pressure inside each gas cylinder is higher than or equal to 1 kPa, the cylindrical barrel rotates relative to a respective gas transport pipe to communicate the vent hole with the through groove.

8. The measurement apparatus for hydrogen solubility and competitive dissolution of multi-component gases according to claim 7, wherein the control mechanism further comprises arc-shaped cylinders, wherein a cylinder body of each arc-shaped cylinder is connected to a fixed seat, a piston rod of each arc-shaped cylinder is connected to a cylindrical barrel, and when each arc-shaped cylinder extends or retracts, the arc shaped cylinder drives the respective cylindrical barrel to rotate relative to the respective gas transport pipe.

9. The measurement apparatus for hydrogen solubility and competitive dissolution of multi-component gases according to claim 8, wherein the control mechanism further comprises two first gears meshed with each other and two second gears meshed with each other, wherein one of the two first gears is fixedly connected to the second magnet and one of the two second gears is fixedly connected to the first magnet, an upper part of the other first gear is connected to a piston barrel, a gas conduit is connected between the piston barrel and each arc-shaped cylinder, a circular plate is slidably connected inside the piston barrel, a screw is connected to a lower surface of the circular plate, the screw is threaded to the other first gear, a bottom end of the screw is connected to a limiting rod, wherein one of the second gears is located directly below the piston barrel through a key and the limiting rod is axially and slidably connected to the one of the second gears located directly below the piston barrel through the key; and
 when the air pressure inside the gas cylinder is lower than 1 kPa, the two first gears and the two second gears rotate synchronously, such that the screw does not rotate relative to one of the two first gears, and the circular plate does not move upwards relative to the piston barrel; and when the air pressure inside the gas cylinder is higher than 1 kPa, the two second gears rotate relative to the two first gears, such that the screw rotates relative to one of the two first gears to allow the circular plate to move upwards relative to the piston barrel, thereby extending each arc-shaped cylinder.

10. A measurement method for hydrogen solubility and competitive dissolution of multi-component gases, wherein the measurement method is applied to the measurement apparatus for hydrogen solubility and competitive dissolution of multi-component gases according to claim 1, and comprises following steps:
   S1, vacuumizing the gas cylinder and a first dissolution cylinder of the two dissolution cylinders, closing a valve of the lower pipeline for transporting the liquid, setting the heat-insulated box to a test temperature after the first dissolution cylinder is vacuumized, opening a connecting valve on the pipeline connecting the first dissolution cylinder and the gas cylinder, injecting hydrogen into the gas cylinder, and stopping the injection when injection pressure of the hydrogen reaches a preset pressure;
   S2, controlling the gas transport pipe of the first dissolution cylinder to open, such that the hydrogen is dissolved in water situated in the first dissolution cylinder, wherein when the hydrogen is dissolved in the water and a volume of the water changes, the first piston plate of the first dissolution cylinder is lifted by volume-changed water to move upwards relative to the first dissolution cylinder; and when the first piston plate of the first dissolution cylinder moves upwards, the second piston plate moves downwards inside the gas cylinder by an equal distance, thereby maintaining the preset pressure of the hydrogen;
   S3, desorbing the hydrogen dissolved in the water, and obtaining an amount of desorbed hydrogen;
   S3-1, repeating the steps S1 and S2;
   S4, after repeating the steps S1 and S2, vacuumizing the gas cylinder and a second dissolution cylinder of the two dissolution cylinders, closing the connecting valve opened in the step S1, opening a connecting valve on the pipeline connecting the second dissolution cylinder and the gas cylinder, opening the valve of the lower pipeline to transport the hydrogen-dissolved water to the second dissolution cylinder, closing the valve of the lower pipeline after the hydrogen-dissolved water is transported to the second dissolution cylinder through the pipeline, injecting a competitive gas into the gas cylinder, and stopping the injection when an injection pressure of the competitive gas reaches a preset pressure;
   S5, controlling the gas transport pipe of the second dissolution cylinder to open, such that the competitive gas is dissolved in the hydrogen-dissolved water, wherein when the competitive gas is dissolved in the water and a volume of the water changes, the first piston plate of the second dissolution cylinder is lifted by the volume-changed water to move upwards relative to the second dissolution cylinder, and when the first piston plate of the second dissolution cylinder moves upwards, the second piston plate moves downwards inside the gas cylinder by an equal distance, thereby maintaining the preset pressure of the competitive gas; and
   S6, desorbing the hydrogen and the competitive gas dissolved in the water, collecting and recording a total amount of a desorbed mixed gas, injecting a collected mixed gas into a gas chromatography-mass spectrometer to determine percentage contents of the hydrogen and the competitive gas, calculating amounts of desorbed hydrogen and desorbed competitive gas, comparing the amounts of the desorbed hydrogen and the desorbed competitive gas with the amount of the desorbed hydrogen in the step S3, and obtaining dissolved amounts of hydrogen and the competitive gas in the water.

* * * * *